United States Patent Office 2,731,397
Patented Jan. 17, 1956

2,731,397

CONVERSION OF HYDROCARBON OILS WITH THE USE OF A SILICA-MAGNESIA CRACKING CATALYST INCORPORATED WITH A SMALL AMOUNT OF STRONTIUM

Henry Erickson, Calumet City, Ill., assignor to Sinclair Refining Company, New York, N. Y., a corporation of Maine No Drawing. Application June 14, 1950, Serial No. 168,155

2 Claims. (Cl. 196—52)

My invention relates to improvements in the manufacture of silica-based cracking catalysts and to improvements in hydrocarbon conversion processes employing these catalysts. These catalysts are of the type designed for use in finely divided, granular, pelleted, or bead form in hydrocarbon conversion processes by contacting the hydrocarbon oil charge stock in vapor or liquid phase. Carbonaceous matter or coke produced in the conversion reaction is adsorbed on the surfaces of the catalyst and is removed in a separate regeneration operation by combustion with an oxygen-containing gas. I have discovered that silica-based cracking catalysts, particularly silica-magnesia and silica-alumina type cracking catalysts, are unexpectedly improved in several respects by incorporation of a small amount of strontium in the catalyst composition. The catalysts are improved with respect to cracking activity, particularly in the sense that the relationship between cracking activity and coke production is improved. Thus the yield of useful products is improved, and the regeneration burden is lessened. I also have discovered that the presence of the strontium material in the catalyst composition directly improves regeneration by increasing the specific carbon burning rate in the combustion of adherent carbonaceous matter with an oxygen-containing gas.

According to my invention, a silica-based cracking catalyst such as silica-alumina is modified by the incorporation of a small proportion of strontium. A highly active cracking catalyst, such as silica-magnesia, is particularly advantageously modified by incorporation of strontium since the slower carbon burning rate of the silica-magnesia catalyst in regeneration is beneficially improved, and the use of silica-magnesia cracking catalysts in existing units of limited coke burning capacity is rendered more feasible. The silica-based cracking catalysts beneficially modified according to my invention include mixtures of active metal oxide components on silica, such as a silica-alumina and -magnesia catalyst, for example.

The strontium modified cracking catalysts are prepared by impregnating the silica based catalyst composition with an aqueous solution of a strontium salt. For quantitative control of the concentration of strontium incorporated, the amount of aqueous solution employed is limited to that which will be completely adsorbed by the catalyst material. Ordinarily the catalyst treated will adsorb about an equal weight of water, but the limiting amount is readily determined by test or may be calculated on the basis of the total pour volume of the catalyst.

Only a small proportion of strontium based on the total weight of the catalyst composition is required to beneficially improve the cracking catalyst. For example, I have prepared cracking catalysts containing as low as 0.1 per cent strontium and as high as 2 per cent strontium and obtained useful results. With up to about 1 per cent strontium, there appears to be improvement in the cracking characteristics of the catalyst, while the improvement in carbon-burning rate appears to be a function of the quantity of strontium incorporated. One of the most valuable properties of the improved catalyst in regeneration is that the carbon dioxide/carbon monoxide ratio in the regenerator flue gases is not increased which is ordinarily the case with burning promoters. The $CO_2/CO$ ratio is substantially unaffected by increasing proportions of the strontium.

My invention will be further described by reference to the following examples:

Example I

Silica-alumina hydrogel in bead form containing about 12 per cent by weight of alumina was calcined for 3 hours at 1000° F. The beads were moistened with a solution containing sufficient strontium nitrate to incorporate about 0.4 per cent strontium in the total composition. Silica-magnesia hydrogel was prepared in bead form containing about 25 per cent magnesia and in similar fashion was calcined and moistened with strontium nitrate solution sufficient in concentration to incorporate about 0.4 weight per cent strontium in the total composition. The strontium promoted catalysts, and the unpromoted catalysts were compared in a bench scale catalyst activity testing unit in contact with a standard gas oil, and samples of the catalyst bearing the below indicated percentages of gas oil-carbon were tested for carbon burn-off time. The test data follow:

| Type | Activity Index | Percent C° | Percent Gas | Gas Grav. | Percent Conv. | Carbon Burning Time | |
|---|---|---|---|---|---|---|---|
| | | | | | | Init., Percent C° | Secs. from 1-0.2% C° |
| $SiO_2-Al_2O_3$ | 45.6 | 3.2 | 7.7 | 1.56 | 52.5 | 0.85 | 800 |
| $SiO_2-Al_2O_3+0.4\%$ Sr | 46.4 | 3.7 | 9.0 | 1.59 | 55.2 | 1.15 | 985 |
| $SiO_2-MgO$ | 47.0 | 6.6 | 8.8 | 1.1 | 59.2 | 0.92 | 1,610 |
| $SiO_2-MgO+0.4\%$ Sr | 47.9 | 7.4 | 8.5 | 1.05 | 60.5 | 0.84 | 708 |

Example II

A typical fluid type silica-magnesia cracking catalyst of about 25 weight per cent magnesia content was calcined for 3 hours at 1000° F. A portion of the sample was moistened with a solution containing sufficient strontium nitrate to incorporate about 0.8 weight per cent of strontium in the total composition. The promoted and unpromoted catalysts were compared in a bench scale activity testing unit in contact with a standard gas oil. Although at the high activity level of the virgin catalyst, total conversion activity is substantially unaffected, the beneficial effect of the strontium addition upon product distribution is reflected in the following data:

| | Relative Activity | D+L | Gas Factor | Coke Factor |
|---|---|---|---|---|
| Blank | 108.0 | 58.0 | 0.69 | 0.60 |
| +0.8% Sr | 106.5 | 57.5 | 0.63 | 0.50 |

Example III

Carbon burning rate was determined for the virgin silica-magnesia catalyst of Example II and the same catalyst containing, respectively, 0.1 per cent strontium and 2.0 per cent strontium, incorporated as strontium nitrate. With a partial pressure of 3 p. s. i. steam, the carbon-burning rate of the unpromoted catalyst was 56.8. With 0.1 per cent strontium in the catalyst composition, the burning rate with 3 p. s. i. steam was improved to 62.5. With 2.0 weight per cent strontium incorporated in the catalyst composition, the burning rate was improved to 83.7. The results are reported in terms of pounds of carbon burned/ton of catalyst/p. s. i.-oxygen/hour. The $CO_2/CO$ ratio in the flue gases was substantially unaffected.

Thus according to my invention, novel strontium-promoted cracking catalysts are prepared by simply impregnating the conventionally prepared catalysts with an aqueous solution of a strontium salt. Strontium nitrate has been described by way of illustration in the above examples but other water-soluble strontium compounds, e. g. strontium hydroxide, may be used. The new strontium promoted cracking catalysts may be used with advantage in cracking systems of various types where the catalyst is handled as a powder or in microspherical form in suspension or fluid type handling systems, or as a compact bed in granular or macro-particle form. In any event, the conversion reaction is conducted at a cracking temperature, e. g. about 750 to 1000° F., and the extent of conversion usually is controlled by control of the space velocity. In accordance with my invention, improved product distribution may be obtained at high conversions, and conversion may be maintained at high levels or may be increased because of the improved regenerability of the new catalysts, thus effectively increasing the coke burning capacity of the cracking unit and the level of conversion that can be economically obtained.

I claim:

1. A silica-magnesia cracking catalyst which has been modified by the incorporation of a small proportion of strontium in an amount of 0.1% to 2% based on the weight of the catalyst.

2. In the conversion of hydrocarbon oils at a cracking temperature in the presence of a cracking catalyst which is cyclically regenerated by combustion of adherent carbonaceous matter with an oxygen-containing gas, the improvement which consists of contacting the hydrocarbon oil with a silica-magnesia cracking catalyst which has been modified by the incorporation of a small proportion of strontium in an amount of 0.1% to 2% based on the weight of the catalyst.

References Cited in the file of this patent

UNITED STATES PATENTS

| Number | Name | Date |
|---|---|---|
| 1,732,381 | Schmidt et al. | Oct. 22, 1929 |
| 2,281,919 | Connolly | May 5, 1942 |
| 2,317,803 | Reeves | Apr. 27, 1943 |
| 2,472,834 | Schexnailder et al. | June 14, 1949 |